RECORD-REPRODUCE MACHINE WITH SERVO-CONTROLLED TRACK SELECTOR

Filed July 20, 1964

INVENTORS
BRUCE N. WHITLOCK
WILLIAM G. WHITNEY
George H. Fritzinger
AGENT

INVENTORS
BRUCE N. WHITLOCK
WILLIAM G. WHITNEY
BY
George H. Fritzinger
AGENT

RECORD-REPRODUCE MACHINE WITH SERVO-CONTROLLED TRACK SELECTOR

Filed July 20, 1964

INVENTORS
BRUCE N. WHITLOCK
WILLIAM G. WHITNEY
BY
George H Fritzinger
AGENT

INVENTORS
BRUCE N. WHITLOCK
WILLIAM G. WHITNEY
BY George H. Fritzinger
AGENT

United States Patent Office 3,424,872
Patented Jan. 28, 1969

3,424,872

RECORD-REPRODUCE MACHINE WITH SERVO-CONTROLLED TRACK SELECTOR

Bruce N. Whitlock, Morris Plains, N.J., and William G. Whitney, Dundee, Ill., assignors to McGraw-Edison Company, Elgin, Ill., a corporation of Delaware Filed July 20, 1964, Ser. No. 383,872
U.S. Cl. 179—100.2 8 Claims
Int. Cl. G11b 5/02

ABSTRACT OF THE DISCLOSURE

An audio visual teaching system comprising a typewriter for typing upper case and lower case characters, a phonographic mechanism having a record drum with separate recording zones therealong wherein each zone has one set of alternate tracks recorded with pronunciations of lower case characters and an intermediate set of alternate tracks recorded with pronunciations of upper case characters, a track selector mechanism and commutator switch synchronized therewith for indexing the record-reproduce head by two-track pitch intervals responsive to operating the keys of the typewriter and for shifting the drum back-and-forth longitudinally by a one-track pitch interval responsive to operating the shift keys of the typewriter, and a manually controlled zone selector commutator for advancing the head into a selected zone and confining the operation of the track selector mechanism to the selected zone.

This invention relates to servo-controlled machines for selectively reproducing characters or discrete bits of information from a pre-recorded multi-track record medium responsive to binary code signals. The invention is especially useful in educational systems as in connection with an exhibitor and/or an electric typewriter for pronouncing automatically the characters as they are shown and/or typed. Such educational system is described, for example, in the pending Kobler et al. application Ser. No. 185,616, filed Apr. 6, 1962 (now Patent No. 3,281,959, dated Nov. 1, 1966). As will appear, the code signals may be produced from a pre-recorded record in synchronism with the operation of the exhibitor or from an encoder operated by the electric typewriter as in teletype systems.

An object of the invention is to provide a servocontrolled track selector mechanism of an expanded range for a given bit binary code, which is responsive to binary code signals to index a reproducer head by multiples of a double track-pitch distance and which is also responsive to certain pre-selected code signals to the shift the record medium by a single track pitch distance.

Another object is to provide a reproducing machine with a track selector mechanism which is selectively conditionable to reproduce from either of two groups of interleaved side-by-side tracks.

Another object is to provide such reproducing machine with a record medium having one set of alternate tracks prerecorded with the pronunciation of lower case characters on the keyboard of a typewriter and the other set of alternate tracks prerecorded with the pronunciations of the upper case characters.

Another object is to provide such track selector mechanism with a special code commutator synchronized with the track selector for performing auxiliary control functions responsive to preselected code signals.

Another object of the invention is to provide a servo-controlled track selector mechanism for reproducing from any one of a plurality of zones on a record medium.

Another object is to provide such track selector mechanism which is operative selectively from different zones on a plurality of different record media.

Another object is to provide such servo-controlled track selector mechanism with a manual zone selector switch and a zone commutator operated by the selector mechanism for driving a selected head of a multi-record machine to a special zone on the respective record and for conditioning the machine for a code-controlled selection of the tracks in the selected zone.

Another object is to provide a language teaching machine having a plurality of pre-recorded zones of different languages and having a manual language selector control and means controlled by depressing the keys of a typewriter to pronounce the respective characters in the selected language zone.

Another object is to provide a reproducing machine adapted for selective parallel operation from two record media at the same time to provide both phonetic and tactile responses to depressing the respective keys of a typewriter.

As will appear, the track selector mechanism is operable to index the respective heads by double track pitch intervals along respective record drums responsive to the respective code signals and the drums are shifted axially by single track pitch intervals to select between upper and lower case characters responsive to depressing the shift keys of a typewriter. A six bit binary code is operable for selecting any one of sixty-four different tracks in a given zone, but two of the code signals are used for selecting between upper case and lower case characters. By use of the special code commutator for selecting between the two groups of interleaved tracks a total selection of one hundred and twenty-six tracks is made possible by a six bit binary code.

The above objects and features of the invention will be apparent from the following description and the appended claims.

In the description of the invention, reference is had to the accompanying drawings, of which:

Figure 1:
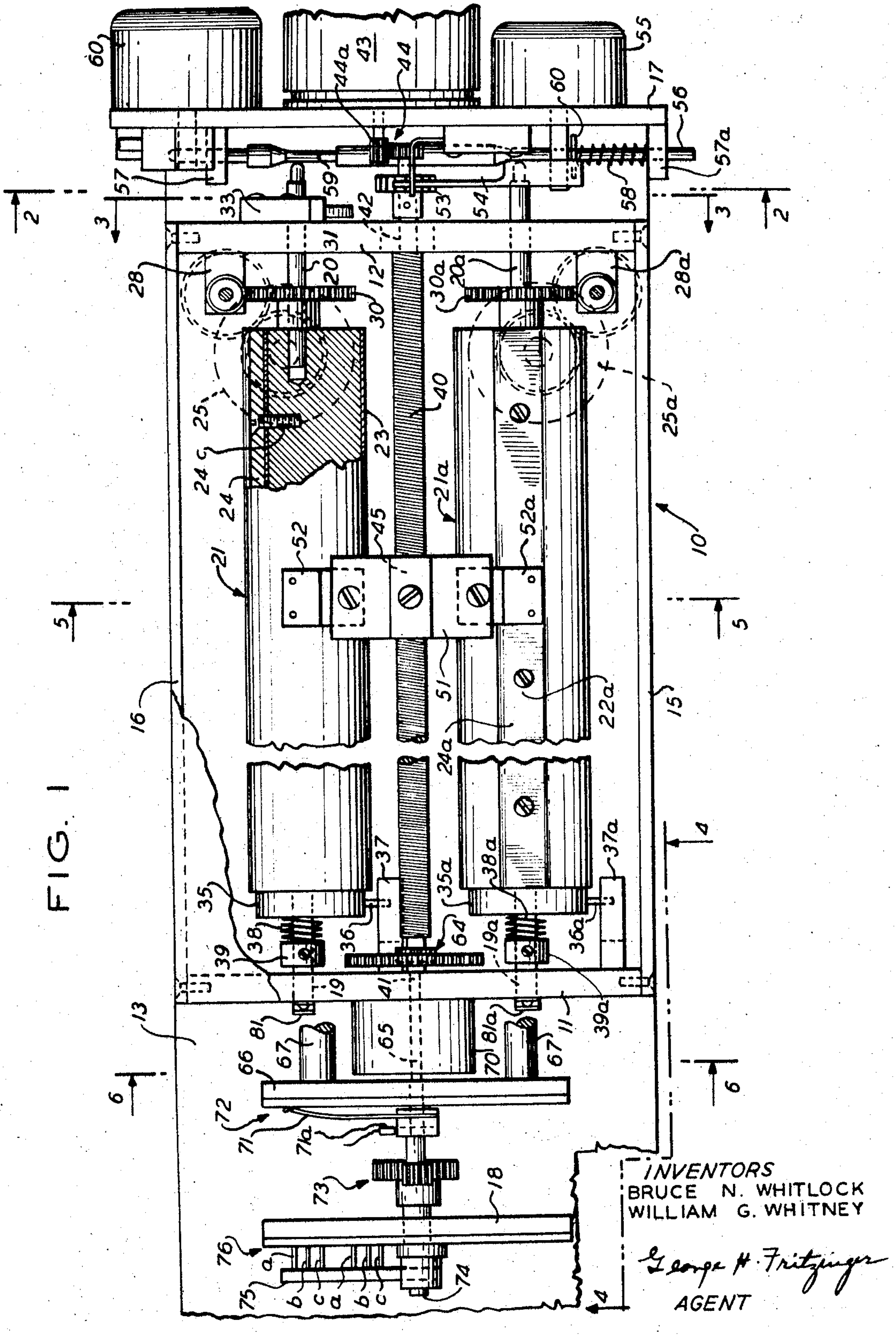
FIGURE 1 is a top plan view of the present reproducing machine.
Figures 2, 3, 4:
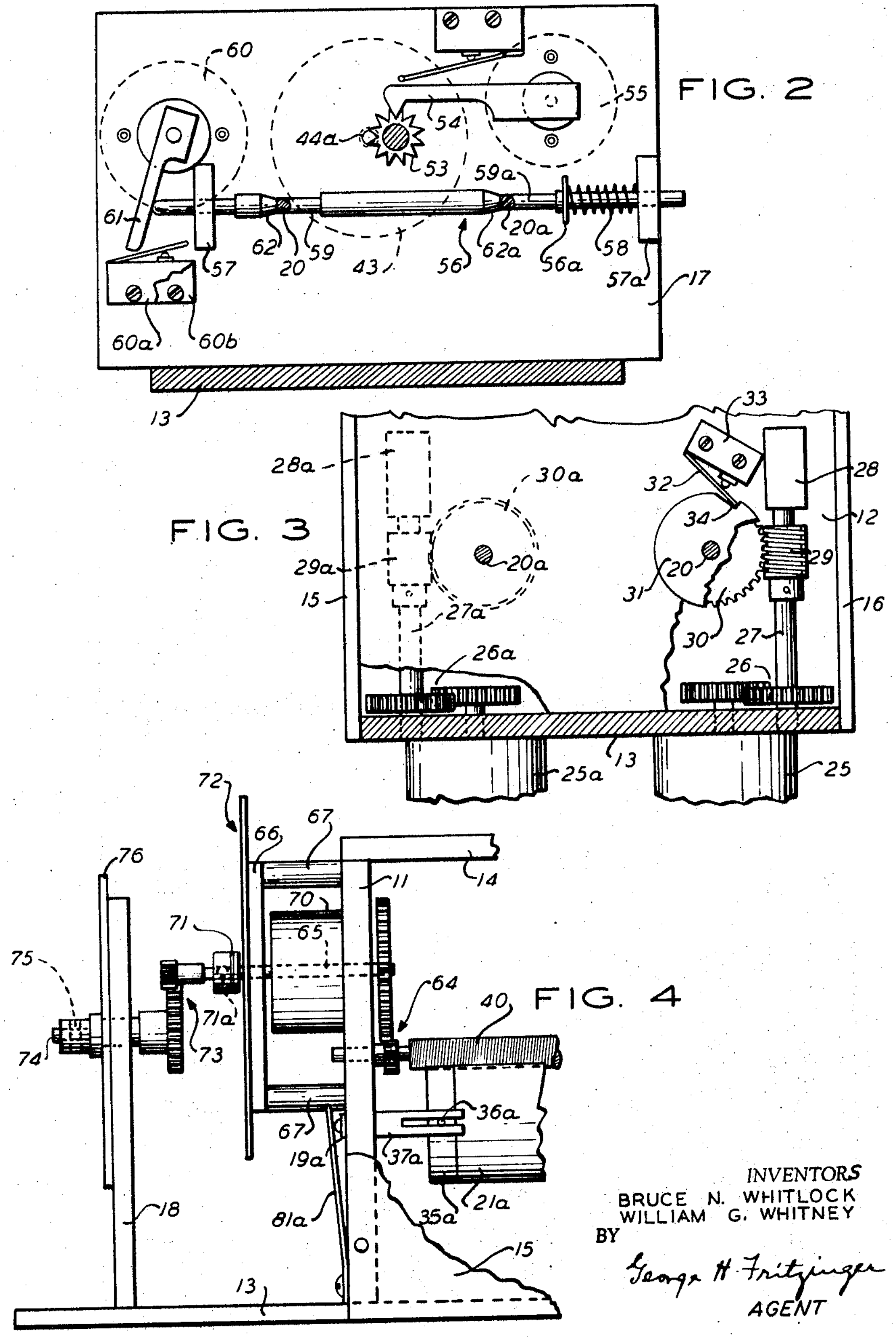
FIG. 2 is a transverse section on the line 2—2 of FIGURE 1.
FIGURE 3 is a transverse section on the 3—3 of FIGURE 1.
FIGURE 4 is a fractional front elevational view of a portion of the machine as it appears from the line 4—4 of FIGURE 1.

The recording and reproducing machine shown in FIGURES 1 to 6 comprises a closed rectangular housing 10 having parallel end plates 11 and 12, a base plate 13, a top plate 14 and front and back side plates 15 and 16. The base plate 13 extends beyond both end plates 11 and 12 to provide a mounting for an additional vertical frame plate 17 at the right end of the machine (FIGURES 1 and 2) and for an additional vertical frame plate 18 at the left end of the machine (FIGURES 1 and 4).

The end plates 11 and 12 have transversely aligned bearings in the rearward portion of the housing for shaft extensions 19 and 20 of a record drum 21, and have transversely aligned bearings in the front portion of the housing for shaft extensions 19*a* and 20*a* of a record drum 21*a*. The record drums 21 and 21*a*, which are identical are long solid cylinders as of aluminum (FIGURE 5) with deep peripheral grooves 22 and **22*a* cut longitudinally thereof. The cylinders are wrapped with magnetic coated record sheet material 23 and 23*a* having opposite end portions folded into the peripheral grooves 22 and 22*a* and clamped in tautened relation of the wrapped material around the drum by respective clamping bars 24 and 24*a* held in place by screws 24*c*** (FIGURE 1).

The record drums 21 and **21*a* are driven by respective drive motors 25 and 25*a* which are end mounted against the bottom face of the base plate 13 (FIGURE 3). The motor shafts extend upwardly through the base plate into the closed housing and are coupled respectively by gears 26 and 26*a* to vertical shafts 27 and 27*a* journaled at their lower ends in the base plate and at their upper ends in bearings provided in blocks 28 and 28*a* respectively. These blocks are mounted on the upper portion of the housing end plate 12 as shown in FIGURES 1 and 3. The shafts 27 and 27*a* have worms 29 and 29*a* pinned thereon which mesh with respective gears 30 and 30*a* on the drum shafts 20 and 20*a*. Typically, the drive motors and drive couplings are adapted to turn the respective drums at a speed of 50 r.p.m. Upon an energization of each drum drive system the respective drum is turned one full revolution. The stopping of the drums after one revolution of movement is controlled by a disk-shaped cam 31 on the shaft extension 20 on which rides an arm 32 of a micro switch 33 mounted on the end plate 12, there being a single peripheral notch 34 in the disk 31** into which the switch arm drops to open the micro switch and stop the drive motors at the end of each revolution of movement, as will more fully appear.

Journaled on the leftward shaft extensions 19 and **19*a* of the record drums are friction disks 35 and 35*a* which are locked against turning by pins 36 and 36*a* engaging slotted studs 37 and 37*a* on the end plate 11. The friction disks bear against the end faces of the record drums under pressure of compression springs 38 and 38*a* located on the shaft extensions between the friction disks and respective collars 39 and 39*a*** pinned to the shaft extensions. The effect of this constant friction load on the record drums is to cause the drums to be driven more smoothly and to stop quickly with a limited inertia overrun when power is cut off from the drive motors.

Figure 5:
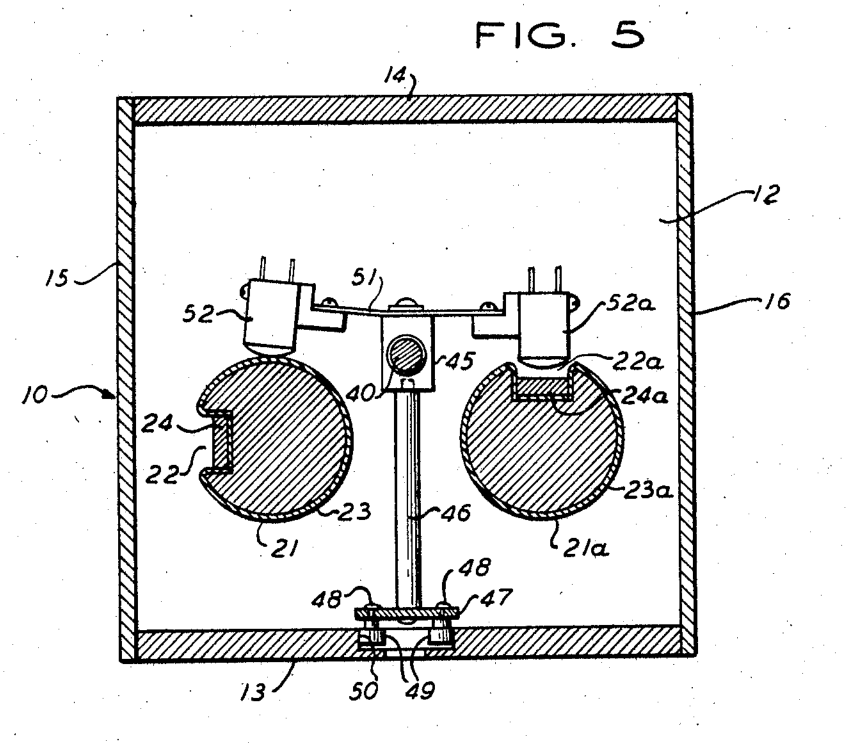
FIGURE 5 is a transverse section on the line 5—5 of FIGURE 1.
Figure 6:
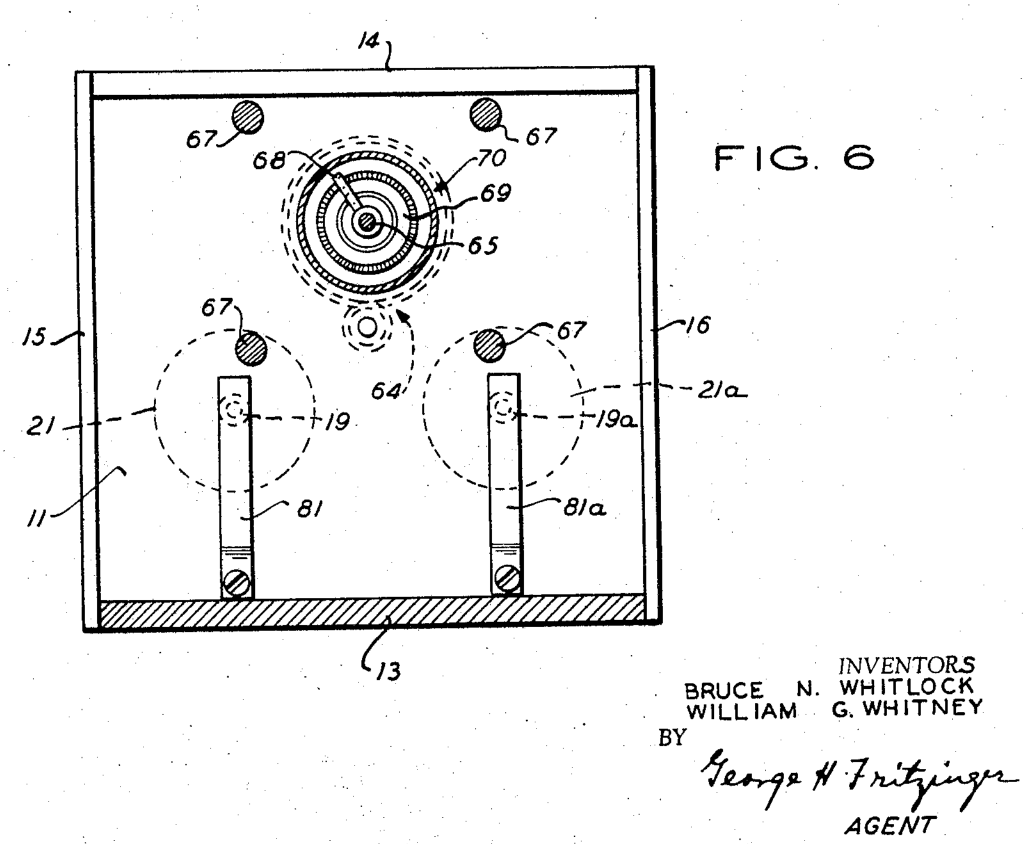
FIGURE 6 is an end view as seen from the line 6—6 of FIGURE 1.

Located midway between the record drums 21 and **21*a* at the upper level thereof is a transverse feed screw 40 having shaft extensions 41 and 42 journaled in the end plates 11 and 12. This feed screw is driven by a servo motor 43 which is end mounted on the vertical frame plate 17 and coupled by gearing 44 to the right end shaft 42 (FIGURE 1). In threaded engagement with the feed screw 40 is a block-shaped feed nut 45 having a long post 46 depending therefrom to the bottom plate 13 (FIGURE 5). Secured to the lower end of the post 46 is a cross plate 47 and riveted to the front and back portions of this cross plate are headed studs 48 on which are journaled respective rollers 49. These rollers engage the opposite walls of a wide trough 50 in the base plate 13** to hold the feed nut against turning on the feed screw while allowing the feed nut to travel along the feed screw.

Secured to the top face of the feed nut 45 is a front-to-back extending double cantilever spring 51. Mounted on the opposite end portions of this spring are record-reproduce magnetic heads 52 and **52*a* having their record engaging faces directly overlying the record drums. In the home or start position of each drum, the head engages the longitudinal groove of the record drum without contacting the record surface. This permits the heads to be scanned along the drums without frictional contact with the record surface. When a drum is rotated from home position as shown for example by drum 21 in FIGURE 5 the head 52 rides up onto the magnetic surface under pressure from the flexure of the spring 51. The feed screw 40 has a coarse thread or pitch of around .6″ and is driven by the servo motor 43** at a speed of approximately 1800 r.p.m. to cause the heads to be scanned along the drums at a speed of 18″ per second.

In the present machine the magnetic heads 52 and **52*a* are scanned to a desired position and there held stationary while the record drum is turned one revolution to pronounce a selected character or to state a selected bit of information. In order that the heads will be scanned to an exact position in registration with a pre-recorded track on the record drum a centralizer wheel 53 provided with deep peripheral V-shaped notches is secured to the feed screw 40. Engageable with this centralizer wheel 53 is a V tipped and spring loaded pawl 54 secured to the shaft of a rotary solenoid 55 mounted on the vertical frame plate 17. The centralizer wheel may have 12 notches which for the .6″ pitch of the feed screw will locate the heads 52 and 52*a*** at intervals of .050″ on the record drums. As before explained, this .050″ interval is twice the pitch distance between successive tracks on the drum.

Figure 7:
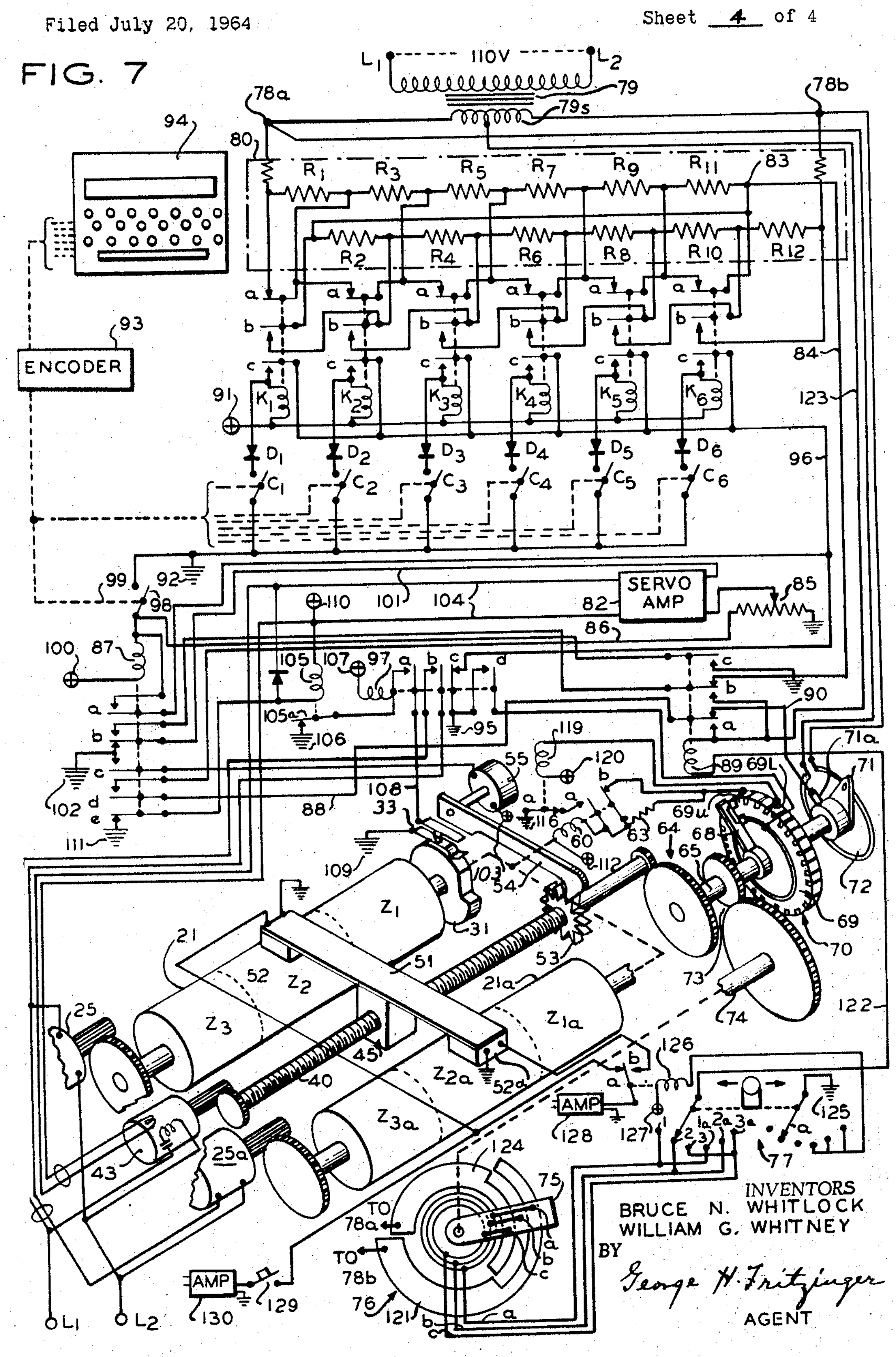
FIGURE 7 is a schematic circuit diagram of a code-controlled servo mechanism according to the invention for selectively registering the reproducer heads with the record tracks responsive to pressing the respective keys of the keyboard of a typewriter.

The record drum shafts are mounted in the end plates 11 and 12 for axial shifting movement through a single track pitch distance of .025″. Normally, the drums are held in their rightward positions by cantilever springs 81 and **81*a* mounted on the end plate 11 and bearing against the shaft extensions 19 and 19*a* as shown in FIGURES 1 and 4. At the right end of the drum shaft extensions is a horizontal front-to-back extending plunger 56 carried slidably at its end portions in apertured blocks 57 and 57*a* mounted on the vertical frame plate 17. The plunger 56 is biased rearwardly by a compression spring 58 between a retainer ring 56*a* on the plunger and the block 57*a* as shown in FIGURE 2. In this position the drum shaft extensions 20 and 20*a* abut against reduced diameter portions 59 and 59*a* under pressure of the springs 81 and 81*a* to locate the record drums 21 and 21*a* in their rightward position. Upon activation of a rotary drum-shift solenoid 60 mounted on the vertical frame plate 17, a lever arm 61 of the solenoid moves against the rear end of the plunger 56 and shifts it forwardly. In so moving the plunger, respective frusto-conical cam surfaces 62 and 62*a* on the plunger are moved past the shaft extensions 20 and 20*a* to cam the record drums leftwardly by one track pitch distance of .025″. The solenoid 60 closes a holding switch 60*a* to keep the record drums in their shifted postions until the holding circuit is broken but in order to reduce the holding current of the solenoid it opens also a switch 60*b* to cut in a resistance 63** as is shown in FIGURE 7.

Coupled to the left end of the feed screw 40 by step-down gearing 64 of 6:1 ratio is a shaft 65 having a journal in the end plate 11 and in a spaced frame plate 66 supported parallel to the end plate 11 on studs 67. Mounted on the shaft 65 between the plates 11 and 66 is a commutator arm 68 which meshes with a printed circuit board 69 as shown in FIGURE 7. This commutator arm 68 and board 69 form a special code commutator 70 for performing special control functions at the respective in-track positions of the heads 52 and **52*a*. In view of the 6:1 step-down in the gearing between the commutator shaft and the feed screw, the commutator arm turns one revolution for each six turns of the feed screw corresponding to a scan distance of 3.6″ of the heads along the record drums. Each such distance along the record drums represents one language zone as beforementioned. The record drums may have an axial length of approximately 11″ to accommodate three such zones, there being therefore a total of six language zones on the record drums 21 and 21*a***.

Secured to an outer end portion of the shaft 65 is a contact arm 71 of a potentiometer 72. This potentiometer arm therefore turns also one revolution through each language zone on the record drums. Electrical connection to the contact arm is made through a brush **71*a*. It is by means of the potentiometer 72** that a bridge servo is brought to a null condition as the heads are shifted to a selected in-track position as will appear.

Coupled to the commutator shaft through 3:1 stepdown gearing 73 is another commutator shaft 74 journaled in the vertical frame plate 18. Mounted on this shaft is a commutator arm 75 which rides on a printed commutator board 76. (FIGURE 7). This commutator thus turns one revolution for each traversal of the heads 52 and 52*a* through the total length of the three language zones on a record drum. This commutator 75–76 is a language selector communicator for bringing the heads into a chosen language zone responsive to shifting a manual language-selector switch 77 as is later described.

The schematic circuit diagram in FIGURE 7 shows a Wheatstone bridge connected across a pair of voltage terminals 78*a* and 78*b* of about 12 volts derived from the secondary 79*s* of a step-down transformer 79 having a primary winding connected to 110 volt 60 c.p.s. source. One branch 80 of the bridge comprises two serially connected arms of which one arm includes a group of six serially connected resistors designated by the letter R with odd-numbered sub-scripts from 1 to 11 and of which the second arm includes a group of six serially connected resistors designated by the letter R with even-numbered subscripts from 2 to 12. There are six different bit relays $K_1$ to $K_6$ of which the relay $K_1$ has switches controlling the bridge resistors $R_1$ and $R_2$, the relay $K_2$ has switches controlling the bridge resistors $R_3$ and $R_4$, etc. The successive resistors of each group are double in value over that of the respective preceding resistors. Thus, starting with the resistors $R_1$ and $R_2$ each equal to 100 ohms, resistors $R_3$ and $R_4$ are each equal to 200 ohms, resistors $R_5$ and $R_6$ are each equal to 400 ohms, etc., to the resistors $R_{11}$ and $R_{12}$ being each equal to 3200 ohms. When a bit relay is operated its *a* contacts remove a short from the respective resistor with the odd-numbered subscript, its *b* contacts place a short across the respective resistors with the even-numbered subscript and its *c* contacts close a holding circuit to keep the bit relay operated after the same has been activated. Any bridge resistance in the branch 80 from zero ohms to 6300 ohms in 100 ohm intervals can be chosen by selective operation of the bit relays.

The second branch of the Wheatstone bridge comprises the potentiometer 72. The diagonal arm of the Wheatstone bridge comprises a servo amplifier 82 connected from the junction 83 between the two arms of the branch 80 to the side contact 71 of the potentiometer 72. This diagonal arm connection is made from the junction 83 via a lead wire 84, switch 89*b* upper contact of a drum zone relay 89, switch 87*b* upper contact of the start relay 87, lead 101, servo amplifier 82, rheostat 85, lead 86, switch 87*d* of the start relay 87, lead 88, switch 9*a* upper contact of the drum zone relay 9 and lead 90 to the slide contact 71 of the potentiometer 72.

The bit relays $K_1$ to $K_6$ are connectable from a common plus terminal 91 of 28 volts to a common ground 92 through respective normally open code switches $C_1$ to $C_6$ and respective diodes $D_1$ to $D_6$. The code switches are operated by an encoder 93 from an electric typewriter 94 as in a teletype system to cause one or a combination of the code switches to be closed as each character is typed. Alternatively, the encoder may be operated from a pre-recorded record in conjunction with an exhibitor or other apparatus with which a synchronized audio operation is to be performed as is taught, for example, by the aforementioned Kobler et al. application.

To illustrate the operation of the bridge servo, let it be assumed a key of the typewriter 94 is depressed causing the code switches $C_1$, $C_4$ and $C_5$ to be operated. Relays $K_1$, $K_4$ and $K_5$ are then operated and find their holding circuits through the respective C contacts to a common ground 95 through lead wire 96 and switch 97*c* of a centralizer relay 97 now not operated. Resistors $R_1$, $R_6$ and $R_9$ then supply 2500 ohms in the first arm of the branch 80, and resistors $R_4$, $R_6$ and $R_{12}$ supply a resistance of 3800 ohms in the second arm of this branch.

At the same time that the encoder 93 operated the code switches $C_1$, $C_4$ and $C_5$ a start switch 98 was also operated via a coupling indicated by the tie line 99. The closing of the start switch activates the start relay 87 from plus terminal 100 to ground 92. Activation of the start relay closes its contacts 87*a* to provide a hold circuit for the relay to ground 95 via the lead 96 and switch 97*c* to keep the start relay operated until the centralizer relay is operated. Also, the operation of the start relay 87 produces the following results (1) it opens switch 87*b* lower contact to disconnect a ground 102 from the input of the servo amplifier 82 and it closes the switch 87*b* upper contact and the switch 87*d* to complete the bridge diagonal circuit just described; (2) it closes switch 87*c* to activate the centralizer solenoid 55 from plus terminal 103 to ground 102, causing the pawl 54 to be disengaged from the centralizer wheel 53 to permit the feed screw to be driven by the servo motor 43; and (3) it opens switch 87*e* to remove ground 11 from a null relay 105 and place this relay under control of voltage from the output of the servo amplifier 82.

When the Wheatstone bridge is unbalanced by the closure of the code switches $C_1$, $C_4$ and $C_5$, a voltage in one direction or the other, depending upon the direction of unbalance, is fed to the servo amplifier and there amplified and fed by a pair of output leads 104 to the variable phase winding of the reversible servo motor 43. Since the fixed phase winding of this motor is connected to a 110 volt, 60 c.p.s. source represented by the terminals $L_1$ and $L_2$, the servo motor is started running to rotate the feed screw 40 and move the heads 52 and 52*a* towards the track on the record drums corresponding to the code signal from the encoder. At the same time, the servo motor drives the potentiometer 72 to restore the bridge to a balanced condition. When the head is moved to within a fractional pitch distance of the selected track the null relay 105 connected across the output of the servo amplifier drops out, closing the relay switch 105*a* and activating the centralizer relay 97 from plus terminal 107 to ground 106. Operation of the centralizer relay closes switch 97*a* to complete a hold circuit 108 for the relay via the drum home switch 33 to ground 109. Also, operation of the centralizer relay closes switch 97*b* to start the drive motors 25 and 25*a* from power terminals $L_1$, $L_2$, opens the switch 97*c* to remove ground from the code relays K and start relay 87 to drop out all or these relays, and it closes switch 97*d* to place ground on the common ring of the code commutator 70. The dropping of the start relay in turn restores ground 102 to the input of the servo amplifier 82 thereby muting the amplifier, opens switch 87*c* to drop the centralizer solenoid 55 causing the pawl 54 to engage the star-shaped centralizer wheel 53 whereby to bring the head 52 to an exact in-track position, opens switch 87*d* to disconnect the input of the servo amplifier from the slide contact of potentiometer 72, and it closes switch 87*e* to reoperate the null relay from a plus terminal 110 to the ground 111. This operation of the null relay opens switch 105*a* to remove ground 106 from the activating circuit of the centralizer relay 97 so as to place this relay under control of its hold circuit 108. As the drum rotates with the head registering with the selected track the character designated on the depressed key of the typewriter is pronounced. When the drum nears one revolution of movement the home switch 33 is opened momentarily by the arm 32 traversing the notch of the disk 31. This momentary opening of the switch 33 drops out the centralizer relay 97 to perform the following operations: (1) it opens the hold switch 97*a* disabling the hold circuit 108; (2) it opens the drive motor switch 97*b* causing the drive motor to come to a stop; (3) it closes switch 97*c* to reconnect ground to the hold circuits of the code and start switches; and (4) it opens switch 97*d* to remove ground from the special code commutator 70. Although a momentary opening of the drum home switch 33 drops the centralizer relay, the drive motor 25 and drum 21, due to inertia, coast sufficiently before coming to a stop to reclose the drum home switch 33 and prepare the hold circuit 108 of the centralizer relay 97 for a next operation. By this dropping of the centralizer relay the machine is restored to its start condition for another encoding responsive to depressing another key of the typewriter.

Each encoding drives the heads to a track position which is an integral multiple of two track pitch distances from the zero position of the language zone in which the heads are operating. These alternate tracks bear recordings of the lower case characters on the keys of the typewriter. The alternate intermediate tracks bear recordings of the upper case characters on the keys of the typewriter. In order to select one of the intermediate tracks it is necessary not only to index the head to a position which is a predetermined number of intervals from the first position in that zone but also, to shift the record drums by one-half index interval—the pitch distance between successive tracks. Such special functions as controlling the drum shift solenoid 60 are carried out by the special code commutator 70. For example, if the 1, 4, 5 code is responsive to depressing the upper case shift key of the typewriter then the terminal 69*u* of the code commutator 70 with which the arm 68 registers responsive to the 1, 4, 5 code is connected through the drum shift solenoid 60 to the plus terminal 112. Thus, in response to depressing the upper case shift key the heads are not only indexed but also the drum shift solenoid 60 is operated from the plus terminal 112 through terminal 69*u* of the special code commutator, and the switch 97*d* of the centralizer relay to ground 95. Operation of the drum shift solenoid closes its *a* contacts to complete a holding circuit to ground 116. The drum shift solenoid is not dropped until the lower case shift key is depressed. When the lower case shift key is depressed the head is indexed to a corresponding position and the arm 68 is moved to register with a corresponding terminal 69L of the code commutator 70. A dropout relay 119 is connected between the terminal 69L and a plus terminal 120. This relay 119 has a normally closed switch 119*a* in the hold circuit of the drum shift solenoid 60. Thus, when the drop-out relay 119 is operated it opens the hold circuit to drop out the drum shift solenoid 60 and return the machine to a condition for reproducing the lower case characters. Again, the machine will remain in a condition for reproducing the lower case characters until the upper case shift key is depressed.

Since the drum shift solenoid 60 requires a high initial power to operate it but very little power to hold it in operated position, a voltage cutdown resistor 63 is connected in the hold circuit of this solenoid but is shorted by the switch 60*b* of the solenoid until the solenoid reaches its operated position. At that point the switch 60*b* opens to insert the resistor 63 in the hold circuit and keep the power consumption in the solenoid to a minimum.

It is to be understood that control of the drum shift solenoid 60 and of the drop-out relay 119 are merely illustrative examples of the special functions which can be controlled by the special code commutator 70. By way of other examples, it might be desirable to actuate a projector, exhibitor or special audio equipment responsive to typing particular lower or upper case characters. It is only necessary to connect the control circuit of such special equipment to the respective terminals of the special code commutator corresponding to the respective character keys in order to obtain such additional control operation.

The language zones of the drum 21 are designated $Z_1$, $Z_2$ and $Z_3$ and of drum 21*a* are designated $Z_{1a}$, $Z_{2a}$ and $Z_{3a}$ as shown in FIGURE 7. The manual language selector switch 77 has six positions corresponding to these six zones of the two record drums. These six positions are designated by the subscripts of the reference characters of the respective zones. Thus, when the switch is thrown to its 1 position (it being shown in its 2 position in FIGURE 7), a circuit is completed from the therminal 78*b* of the twelve volt winding 79*s* through the outer commutator segment 121 of the language commutator 76 to slide contact 75*a* of the brush arm 75, outer slip ring *a* to contact 1 of selector switch 77, lead 122, drum zone relay 89 and lead 123 to the center tap of the twelve volt winding 79*s*. This places six volts across the drum zone relay 89 causing it to operate and performs the following functions: (1) it closes switch 89*c* to activate the start relay 87; (2) it throws switch 89*a* to shift the input lead 86 of the servo amplifier 82 from the slider 71 of the potentiometer 72 to the center tap of the twelve volt winding 79*s*; and (3) it throws the switch 89*b* to shift the other input lead 101 of the servo amplifier from the junction 83 of the bridge 80 to the terminal 78*b* of the 12 volt winding via lead 122, zone selector switch 77, *a* ring of the language commutator 76, slide contact 75*a* and commutator segment 121. The resultant operation of both the start relay 87 and the drum zone relay 89 therefore connects the servo amplifier across the right half of the twelve volt winding 79*s* to activate the servo motor 43 in a direction to drive the heads 52 and 52*a* into the number 1 zone. The instant the heads enter this zone the slide contact 75*a* rides off the commutator segment 121 to stop the servo motor. After the heads are so moved into the 1 zone the machine will respond to encodings from the typewriter 94 in the usual way to select the respective tracks in that zone.

If the language zone switch 73 had been moved from its 2 position shown in FIGURE 7 to its 3 position, the drum zone relay would be again connected across one-half of the twelve volt winding 79*s* and would be operated in the same way as before, but the input of the servo amplifier would be connected across the left half of the twelve volt windings 79*s* instead of the right half. For instance, the mid tap of the winding 79*s* would be again connected via lead 123, switch 89*a* lower contact, lead 88, switch 87*d* and lead 86 to the lower input terminal of the servo amplifier, and the upper input terminal of the servo amplifier would be connected by the lead 101, switch 87*b* upper contact, switch 89*b* lower contact, lead 122, selector switch 77 position 3, the C slip ring of the commutator 76, slide contact 75*c* of the brush 75 and the segment 124 of this commutator to the terminal 78*a* of the twelve volt winding 79*s*. This reverses the phase of the voltage fed to the servo motor 43 from that which occurred when the selector switch 77 was thrown to its 1 position to cause the servo motor to drive the heads from zone 2 to zone 3.

The language selector switch has six positions the last three of which repeat the functions of the first three positions as far as zone selection is concerned. However, this selector switch has a second section 77*a* which in the last three positions connect ground 125 through a head switching relay 126 to plus terminal 127. Operation of this relay 126 shifts its switch 126*a* to disconnect the head 52 from the audio amplifier 128 and to connect the head 52*a* to this amplifier. Thus, in the last three positions of the selector switch the machine is conditioned for operation in the respective zones of the second drum 21*a*.

Since both heads 52 and 52*a* are operative continuously relative to the respective drums 21 and 21*a*, a closing of a switch 129 while the selector switch 77 is in either of its first three positions for reproducing from the respective zones on drum 21 via the amplifier 128 will connect the other head 52*a* to another amplifier 130 for reproducing simultaneously from the respective zones on the drum 21*a*. This parallel use of both drums may be used to provide a tactile response from the respective tracks of one drum simultaneously as a sound response is obtained from the respective tracks of the other drum.

The embodiment of our invention herein particularly shown and described is intended to be illustrative and not necessarily limitative of our invention since the same is subject to changes and modifications without departure from the scope of our invention, which we endeavor to express according to the following claims.

We claim:

1. In an educational system including a machine for recording and/or reproducing selected characters or other information: the combination of a rotatable support for a record medium having equally spaced tracks thereon, a record-reproduce head shiftable across said record medium, a servo-controlled track selector mechanism responsive to binary code signals for indexing said head selectively into in-track positions on said record medium, and means for performing specific control operations at respective in-track positions of said head comprising a commutator switch operated by said track selector mechanism in correspondence with the indexing of said head.

2. The educational system set forth in claim 1 wherein said support is a record drum having respective circumferential tracks thereon, means supporting said drum for rotational movement and for back-and-forth longitudinal movement by the pitch distance between successive tracks, means for shifting said drum from normal position by said pitch distance and for returning the drum when said shifting means is deactivated, said track selector mechanism being adapted for indexing said head by multiples of a double-track pitch distance to register the head selectively with one set of alternate tracks when the drum is in normal position and with the intermediate set of alternate tracks when the drum is in its shifted position, and means controlled by said switch commutator when said head is indexed responsive to a first predetermined code signal for activating said shifting means into a hold-operated condition and controlled by said switch commutator when said head is indexed responsive to a second predetermined code signal for detactivating said shifting means to return the drum to normal position.

3. The educational system set forth in claim 2 including a typewriter having character keys with upper and lower case characters designated thereon and having upper case and lower case shift keys, said one set of alternate tracks being prerecorded with pronunciations of said lower case characters and said set of intermediate tracks being recorded with pronunciations of said upper case characters, and a set of code switches controlled by said typewriter for selectively operating said track selector mechanism wherein said code switches are operated to produce said first predetermined code signal to shift said drum and cause said head to be indexed to said intermediate set of tracks when said upper case shift key is in a depressed condition and to produce said second predetermined code signal to return said drum to normal position and cause said head to be indexed to said one set of tracks after said lower case shift key is depressed.

4. The system set forth in claim 2 wherein said drum has a plurality of recording zones each including said one set of alternate tracks and said intermediate set of alternate tracks, including a manually settable zone selector means for shifting said head to a selected zone and concurrently conditioning said track selector mechanism for operation confined to the selected zone.

5. An audio visual teaching machine including a typewriter having a keyboard with upper and lower case characters designated thereon and having upper and lower case shift keys, a phonographic machine including a record drum having equally spaced tracks thereon of which a first set of alternate tracks is prerecorded with information relating respectively to said lower case characters and a second set of intermediate tracks is prerecorded with information relating respectively to said upper case characters, and a record-reproduce head cooperable with said drum, a track selector mechanism responsive to depressing said typewriter keys for indexing said head along said drum by multiples of a two-track pitch distance to register the head with the tracks corresponding to said lower case characters, means responsive to depressing said upper case shift key for shifting said drum longitudinally from normal position by the pitch distance between successive tracks whereby said head is then indexed to register with said second set of intermediate tracks as the typewriter is operated to type upper case characters, and means responsive to depressing said lower case shift key for returning said drum longitudinally to normal position whereby said head is indexed to register with said first set of tracks as the typewriter is operated for typing lower case characters.

6. In a machine for recording and/or reproducing respective characters or other information: the combination of a record drum supported for rotary movement, a carriage mounted for movement along said drum, a record-reproduce head mounted on said carriage, a feed screw in permanent engagement with said carriage for shifting said head into registration selectively with a set of prerecorded tracks on said drum, a commutator having a succession of terminals and a rotary cooperating arm coupled to said feed screw to cause the arm to register with successive terminals respectively as said head is registered successively with said tracks, means for rotating said drum by one revolution while said head is in a selected in-track position to reproduce the recordations in said track, and circuit means connected to said commutator for producing respective control operations timed with the reproduction of said respective tracks.

7. In combination, a record drum having a series of separate circumferential tracks, a keyboard having keys with characters designated thereon, said tracks being prerecorded with pronunciations of said respective characters, a Wheatstone bridge having one branch of differently connectable resistors and another branch comprising a potentiometer, code relays for differently connecting said resistors of said one branch, an encoder operable by said keyboard for differently activating said code relays responsive to depressing the different keys of said keyboard, a record-reproduce head movable along said drum, a reversible servo motor, means responsive to an unbalance current across said bridge following an encoding of said relays for operating said servo motor to shift said head to a track position corresponding to the encoding of said relays and for concurrently operating said bridge potentiometer to restore said bridge to a balanced condition, a drive motor for rotating said drum, means responsive to said bridge reaching a balanced condition for stopping said servo motor and for starting said drive motor, switch means operable by said drum upon completion of one revolution of driven movement for stopping sad drive motor, said record drum having a plurality of recording zones, a drum selector-zone commutator coupled to said servo motor, circuit means including a zone selector switch and said drum zone commutator for supplying an A.C. current to said servo motor of one phase when the head is spaced in one direction from a selected zone and of opposite phase when the head is spaced in the other direction from the selected zone to cause the servo motor to drive the head into the selected zone responsive to a setting of said zone selector switch, said potentiometer being of a rotary type, and means coupling said servo motor to said bridge potentiometer to move the potentiometer through one revolution during a travel of said head through one zone on said drum whereby said encoder is operable to index said head to respective track positions in each of the selected zones on said drum.

8. In combination, a rotatable support for a record medium having a plurality of recording zones spaced in a given direction across the record medium each recorded with information bits in a different language, a reproducer head mounted for indexing movement into successive positions across said respective zones, an A.C. reversible servo motor having a fixed phase winding an a variable phase winding for driving said head in one drection or the other depending on the phase of the current to said latter winding, a manual zone selector switch, and circuit means responsive to shifting said manual switch to a selected zone position for feeding a current to said drive motor to start the same, said circuit means including a zone commutator having a brush arm driven by said motor through one revolution during one full traversal by said head across the zones on said record medium, said commutator including means for controlling the phase of the current fed to said variable phase winding to cause the head to be driven in the direction towards the selected zone, and said commutator including means for breaking the circuit to said variable phase winding to stop the same as said head is moved into a selected zone.

References Cited

UNITED STATES PATENTS

| | | | |
|---|---|---|---|
| 1,746,959 | 2/1930 | Neely | 340—174.1 |
| 2,080,100 | 5/1937 | Tauschek | 179—100.2 |
| 2,869,966 | 1/1959 | Cunningham | 346—74 |
| 2,944,116 | 7/1960 | Vershoven | 179—100.2 |
| 2,991,448 | 7/1961 | Diamond | 179—100.2 |
| 3,081,431 | 3/1963 | Werner | 179—100.2 |
| 3,130,393 | 4/1964 | Gutterman | 340—174.1 |
| 3,200,385 | 8/1965 | Welsh | 340—174.1 |
| 3,281,959 | 11/1966 | Kobler | 35—6 |

BERNARD KONICK, *Primary Examiner.*

H. STECKLER, *Assistant Examiner.*

U.S. Cl. X.R.

35—5, 35; 181—31